(12) United States Patent
Alfieri

(10) Patent No.: US 9,106,401 B2
(45) Date of Patent: Aug. 11, 2015

(54) DETERMINISTIC SYNCHRONIZATION FOR TRANSMITTING SIGNALS BETWEEN DIFFERENT CLOCK DOMAINS

(75) Inventor: Robert A. Alfieri, Chapel Hill, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 57 days.

(21) Appl. No.: 13/529,962

(22) Filed: Jun. 21, 2012

(65) Prior Publication Data

US 2013/0343441 A1    Dec. 26, 2013

(51) Int. Cl.
*H04B 3/46* (2006.01)
*H04L 7/033* (2006.01)
*H04L 7/02* (2006.01)

(52) U.S. Cl.
CPC ............. *H04L 7/0337* (2013.01); *H04L 7/02* (2013.01)

(58) Field of Classification Search
CPC ......... H03L 7/087; H03L 7/0814; H03L 7/06; H03L 7/0805; H03L 7/0818; H03L 7/0995; H03L 7/08; H03L 7/089; H03L 7/091; H04L 7/033; H04L 7/0331; H04L 27/18; H04L 7/04; H04L 7/0337; H04L 7/02
USPC ........................... 375/224, 373, 374, 375, 376
See application file for complete search history.

(56) References Cited

U.S. PATENT DOCUMENTS

| | | | | |
|---|---|---|---|---|
| 7,782,992 | B2* | 8/2010 | Nagarajan | 375/355 |
| 8,248,136 | B1* | 8/2012 | Zhang et al. | 327/277 |
| 8,735,790 | B2* | 5/2014 | Schulte et al. | 250/201.3 |
| 2003/0172361 | A1* | 9/2003 | Chiu | 716/6 |
| 2007/0236269 | A1* | 10/2007 | Viswanathan | 327/276 |
| 2008/0303570 | A1* | 12/2008 | Lee | 327/161 |
| 2011/0116337 | A1* | 5/2011 | Hay et al. | 365/233.11 |
| 2012/0063296 | A1* | 3/2012 | Wang et al. | 370/216 |
| 2012/0072632 | A1* | 3/2012 | Kimelman | 710/264 |
| 2013/0043915 | A1* | 2/2013 | Gupta | 327/145 |

* cited by examiner

*Primary Examiner* — Dhaval Patel
(74) *Attorney, Agent, or Firm* — Artegis Law Group, LLP

(57) ABSTRACT

One embodiment sets forth a technique for deterministic synchronization of signals that are transmitted between different clock domains. The relative phase difference between a source clock domain and a destination clock domain is characterized and the source clock and/or the destination clock are delayed as needed to generate phase-shifted versions of the source and destination clocks for use during a deterministic operating mode. The phase-shifted versions of the source and destination clocks are non-overlapping, meaning that the rising edge of the destination clock does not occur when the source clock is asserted. The non-overlapping source and destination clocks are used by a deterministic synchronization unit to ensure that signals being transmitting from the source clock domain to the destination clock domain are not sampled within a metastability window.

23 Claims, 9 Drawing Sheets

DETERMINISTIC SYNCHRONIZATION FOR TRANSMITTING SIGNALS BETWEEN DIFFERENT CLOCK DOMAINS

BACKGROUND OF THE INVENTION

1. Field of the Invention

The present invention generally relates to transmitting signals between different clock domains and, more specifically, to deterministic synchronization for transmitting signals between different clock domains.

2. Description of the Related Art

In many computer systems, signals that are passed from a first clock domain to a second clock domain are usually transmitted through a synchronization unit that resides between the two clock domains to ensure that no data is lost. However, conventional synchronization units have inherent non-deterministic behavior, meaning that a particular sequence of signal transitions passed multiple times from the first clock domain is not always output as a consistent sequence of transitions in the second clock domain. In other words, different sequences of signal transitions may occur in the second clock domain when the same sequence of signal transitions is applied in the first clock domain, such that a signal may transition one clock cycle earlier or later in the second due to variations in the resolution of metastable values. The non-deterministic behavior of the synchronization unit occurs because the flip-flops used in the synchronization unit may sample and resolve metastable values differently, even when the same sequence of transitions is passed between the two clock domains.

The non-deterministic behavior of the synchronization unit presents difficulties during functional debug of a device because applying same test stimulus multiple times in the first clock domain may produce inconsistent results in the second clock domain. Functional debug necessitates repeatability of a failure in order to successfully isolate, diagnose, and correct the circuitry causing the failure. With non-deterministic behavior, however, such repeatability is not guaranteed.

As the foregoing illustrates, what is needed in the art is a technique for deterministic synchronization of signals that are transmitted between different clock domains.

SUMMARY OF THE INVENTION

A system and method for deterministic synchronization of signals that are transmitted between different clock domains characterizes the relative phase difference between a source clock domain and a destination clock domain and delays the source clock and/or the destination clock to operate in a deterministic mode.

Various embodiments of a method of the invention for transmitting a signal between a first clock domain and a second clock domain include determining a relative phase difference between a source clock of the first clock domain and a destination clock of the second clock domain and configuring a delay element based on the relative phase difference to generate a phase-shifted source clock and a phase-shifted destination clock. The signal is transmitted between the first clock domain and the second clock domain using the phase-shifted source clock and the phase-shifted destination clock.

One advantage of the disclosed method is that the deterministic mode can be used to debug functional failures as well as timing failures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Traditional synchronization circuits have inherent non-determinism resulting from potentially different cycle-by-cycle resolution of metastable values when the same set of test vectors is applied to a system including the traditional synchronization circuits. To debug a failing set of test vectors, it is necessary to isolate the failure to a particular clock cycle. A deterministic synchronization unit may be configured to operate in a "deterministic mode" to ensure that the synchronization circuits within the deterministic synchronization unit do not sample metastable values. Data and clock signals within the deterministic synchronization unit are skewed using configurable delay elements to ensure that metastable values are not sampled. The clock signals are generated from the same phase locked loop (PLL) and are integer multiples of each other, e.g., 1:1, 2:1, 3:1, and the like. When the deterministic synchronization unit is configured in the deterministic mode, the synchronization circuits transfer gray codes between a first clock domain and a second clock domain such that the same results are produced for multiple applications of the same text vectors. In other words, the deterministic synchronization unit deterministically synchronizes the signals when configured in the deterministic mode. The exact clock cycle when a failure occurs during a test may be identified to enable debug of functional and/or timing failures.

Figure 1:
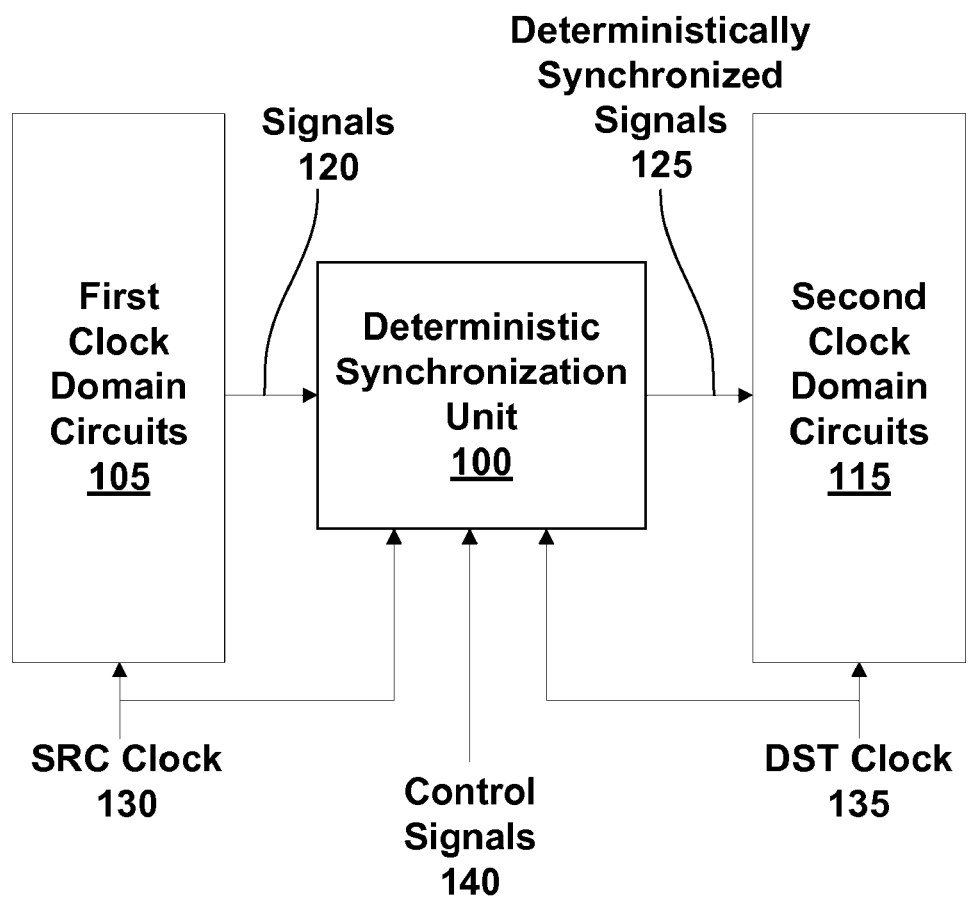
FIG. 1 is a block diagram illustrating a block diagram including a deterministic synchronization unit that is configured to implement one or more aspects of the present invention.

Deterministic Synchronization for Transmitting Signals Between Different Clock Domains FIG. 1 is a block diagram illustrating a block diagram including a deterministic synchronization unit 100 that is configured to implement one or more aspects of the present invention. A source (SRC) clock 130 is provided to first clock domain circuits 105 and a destination (DST) clock 135 is provided to second clock domain circuits 115. The SRC clock 130 and the DST clock 135 must be driven off the same PLL to ensure that the only clock drifting that may occur is the result of temperature drift. If the SRC clock 130 and the DST clock 135 are generated using different PLLs, the SRC clock 130 and the DST clock 135 may drift in opposing directions. The ratio between frequencies of a pair of clocks at any asynchronous boundary, e.g., SRC clock 130 and the DST clock 135, must be an integer ratio e.g., 1:1, 2:1, 3:1, and the like. In contrast, 3:2 is not an integer ratio.

The deterministic synchronization unit 100 is coupled between the first clock domain circuits 105 and the second clock domain circuits 115 to transfer signals 120 to the second clock domain circuits 115 as deterministically synchronized signals 125. The deterministic synchronization unit 100 receives both the SRC clock 130 and the DST clock 135 as inputs. The deterministic synchronization unit 100 also receives control signals 140 that configure the deterministic synchronization unit 100 to reset, scan in or out test data, operate in a deterministic mode, and operate in a mode to transfer signals between two clock domains in a manner that is not necessarily deterministic, i.e., non-deterministic mode. Details of the circuitry within the deterministic synchronization unit 100 are described in conjunction with FIGS. 2A, 2B, and 2C.

Figure 2A:
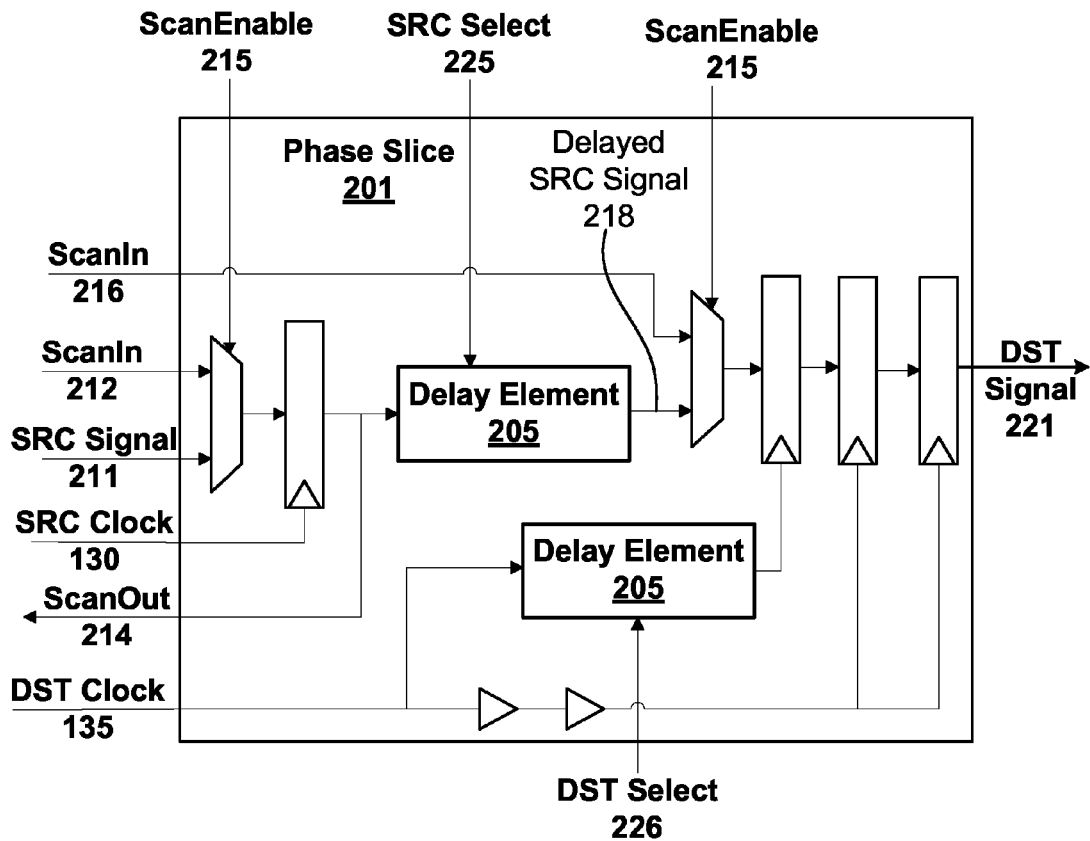
FIG. 2A is a block diagram of a phase slice circuit, according to one embodiment of the present invention.

FIG. 2A is a block diagram of a phase slice circuit 201, according to one embodiment of the present invention. The phase slice 201 is employed to detect phase offsets between a first clock and a second clock as described in conjunction with a phase detection circuit 200 shown in FIG. 2C. The phase slice 201 is also employed to transfer signals from the first clock domain to the second clock domain as shown in the deterministic synchronization unit 300.

When the deterministic synchronization unit 100 is configured in the deterministic mode, the SRC clock 130 and the DST clock 135 are guaranteed to be running off the same PLL and the frequency of the DST clock 135 is an integer multiple of the frequency of the SRC clock 130 or vise versa. The phase slice circuit 201 contains delay elements 205 that are configured by outside control logic through DST select 226 to guarantee that a single bit signal to be transmitted is passed between the clock domains outside of a metastability window. The configurable delays encoded by DST select 225 and 226 are calculating using phase-detect synchronizers that are local to the phase slice 201 to minimize any differences due to process variations.

When ScanEnable 215 is asserted the phase slice 201 operates in a scan mode to transmit the ScanIn 212 input to the ScanOut 214 output and to transmit the ScanIn 216 input to the DST signal 221 output. When the phase slice 201 is not configured to operate in a scan mode, a signal to be transmitted from the SRC clock domain to the DST clock domain is input at the SRC signal 211 input. The SRC signal 211 passes through a first multiplexer to a first flip-flop that is clocked by the SRC clock 130 to a first delay element 205. The first delay element 205 is configured by a SRC select 225 to produce a delayed SRC signal 218 that is delayed compared with the SRC signal 211. The delayed SRC signal 218 is passed through a second multiplexer and input a sequence of flip-flops that are clocked by versions of the DST clock 135. Although three flip-flops are shown in sequence in FIG. 2A other numbers of flip-flops may be used the sequence.

The delay resulting from two buffers between the DST clock 135 to the last two flip-flops in the sequence should be substantially equal (or slightly greater than) the delay from the DST clock 135 to the first flip-flop in the sequence when DST Select 226 is configured for non-deterministic operation (DSR Select 226=2'b00) to maximize the resolve time during transmission of the delayed SRC signal 218 to the DST signal 221. In other words, the DST clock 135 should arrive at each of the three flip-flops in the DST clock 135 clock domain at the same time. Maximizing the resolve time between the first flip-flop in the sequence through the second and third flip-flops in the sequence reduces the likelihood of a failure due to metastability. The flip-flops in the sequence should be designed and laid out for fabrication to have the same operating characteristics.

Figure 2B:
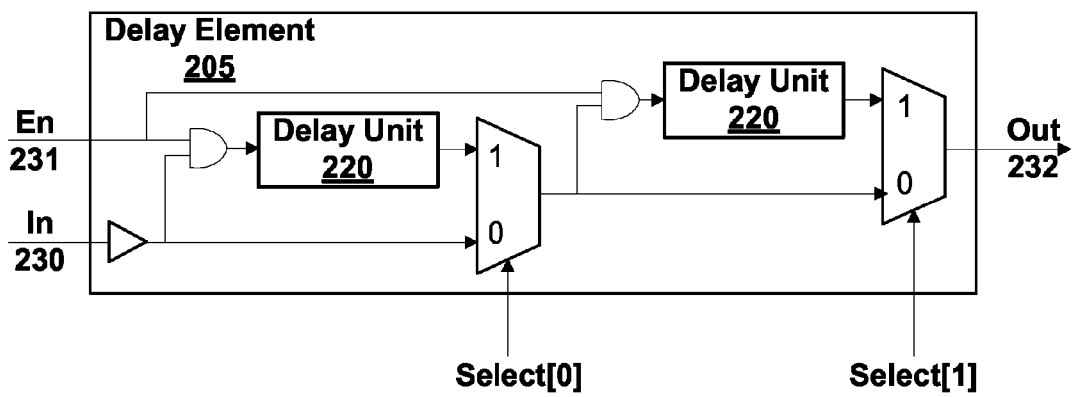
FIG. 2B is a block diagram of the delay element circuit of FIG. 2A, according to one embodiment of the present invention.

FIG. 2B is a block diagram of the delay element 205 of FIG. 2A, according to one embodiment of the present invention. A signal applied to the in 230 input of the delay element 205 is delayed according to the select[0] and select[1] inputs to generate the delayed version of the signal at the output, out 232. In one embodiment, each delay element 205 is split into two equal segments to enable more precise control over the delay and tolerate greater variations in the operating characteristics, i.e., to increase the operating margin. The first delay unit 220 may have a DSR select 226 set to 2'b00 and the second delay unit 220 may have a DSR select 226 set to 2'b00, 2'b01, or 2'b11. Alternatively, the second delay unit 220 may have a DSR select 226 set to 2'b00 and the first delay unit 220 may have a DSR select 226 set to 2'b00, 2'b01, or 2'b11. In one embodiment, the base delay of a delay unit 220 should be ⅕ the minimum clock period for the SRC clock 130 and the DST clock 135.

An AND gate may be coupled to the input of each delay unit 220 to disable the delay unit 220 to reduce power consumption by negating the enable signal En 231. For example, when the delay element 205 is disabled (select[0] and select [1] are both negated) the delay element 205 may be disabled by forcing the input to the delay element 205 to a constant value. In other embodiments, other types of logic or circuitry may be used to disable the delay unit 220.

In one embodiment, the delay element 205 is laid out to conform to the following rules for a 28 nm process technology assuming a minimum clock period of 1000 picoseconds (ps). The delay introduced by the delay unit 220 is 200 ps in the slow-slow/low-voltage corner (⅕*1000 ps), where SS/LV corner=−3 sigma, 0.90 volts, 105 C, 1.0 GHz max. The delay introduced by the delay unit 220 is at least 60 ps in the fast-fast/low-voltage corner, and no more than 166 ps (⅕*833 ps), where FF/HV corner=3 sigma, 1.10 volts, 0 C, 1.2 GHz max. Finally, the delay elements 205 should introduce the same delay when configured in the same manner (by SRC select 225 and DST select 226).

Figure 2C:
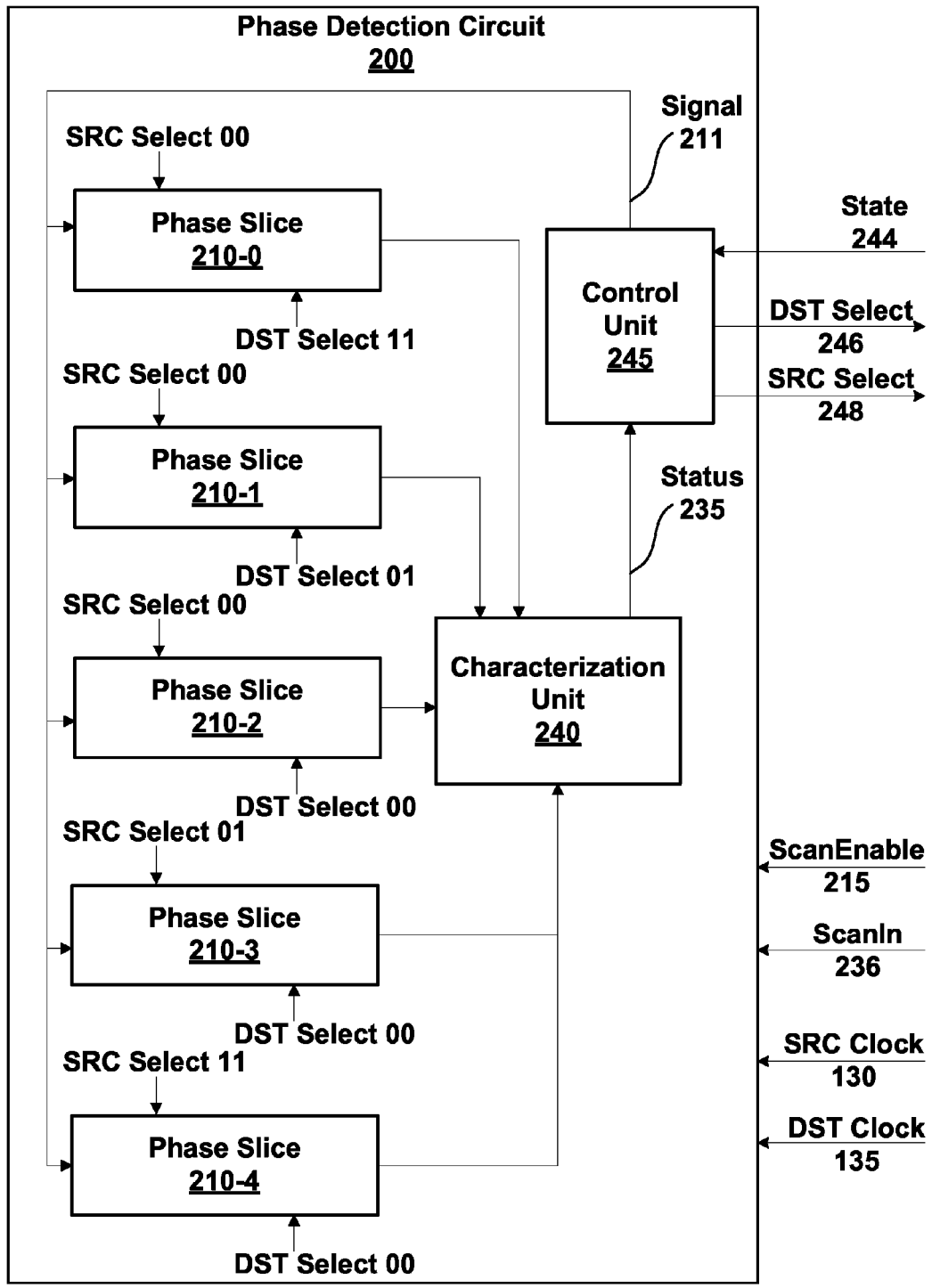
FIG. 2C is a block diagram of a phase detection circuit including the phase slice circuit of FIG. 2A, according to one embodiment of the present invention.

FIG. 2C is a block diagram of a phase detection circuit 200 including multiple phase slice circuits 201 of FIG. 2A that are configured to perform relative phase measurements, e.g., phase slices 210-0, 210-1, 210-2, 210-3, and 210-4, according to one embodiment of the present invention. The phase detection circuit 200 characterizes the relative phase offset between the SRC clock 130 and the DST clock 135. The phase detection circuit 200 generates the DST select 246 and SRC select 248 signals that are input to the DST select 226 and SRC select 225 inputs of the phase slice 201 (outside of the phase detection circuit 200) based on the relative phase offset.

The phase detection circuit 200 receives a state 244 input, the SRC clock 130, the DST clock 135, a ScanEnable 215, and a ScanIn 236. The ScanEnable 215 and ScanIn 236 signals are used during scan operations. ScanOut signals are not shown in FIG. 2C. A control unit 245 decodes the state 244 and generates a signal 211 which is a simple toggling value that is provided as an input to the SRC signal 211 input of phase slices 210-0, 210-1, 210-2, 210-3, and 210-4. The phase slices 210-0, 210-1, 210-2, 210-3, and 210-4 are configured to transmit the SRC signal 211 to a characterization unit 240 according to the select values provided to the SRC select 255 and DST select 226 inputs of each one of the phase slices 210-0, 210-1, 210-2, 210-3, and 210-4. Note, that although the connections are not explicitly shown in FIG. 2C, the DST clock 135 and SRC clock 130 are provided to each of the phase slices 210-0, 210-1, 210-2, 210-3, and 210-4.

The phase slice 210-0 is configured to introduce no delay, i.e., the delay units 220 are bypassed for the SRC clock 130 and to introduce two units of delay for the DST clock 135. The phase slice 210-1 is configured to introduce no delay for the SRC clock 130 and to introduce one unit of delay for the DST clock 135. The phase slice 210-2 is configured to introduce no delay, i.e., the delay units 220 are bypassed, for both the SRC clock 130 and the DST clock 135. The phase slice 210-3 is configured to introduce one unit of delay for signals output by a flip-flop clocked by the SRC clock 130 and to introduce no delay, i.e., the delay units 220 are bypassed, for the DST clock 135. The phase slice 210-4 is configured to introduce two units of delay for signals output by a flip-flop clocked by the SRC clock 130 and to introduce no delay for the DST clock 135.

The characterization unit 240 receives the outputs generated by the phase slices 210-0, 210-1, 210-2, 210-3, and 210-4 and generates status 235. The control unit 245 receives the status 235 and generates the SRC select 248 and the DST select 246 that may be provided to the DST select 226 and SRC select 225 inputs to configure one or more multiple phase slices 210. The values of DST select 246 and SRC select 248 depend on the configuration of the phase detection circuit 200 as controlled by the state 244. More specifically, the state 244 is used to configure the phase detection circuit 200 into various states, such as "disabled", "initialize", "phase_detect", and "phase_lock".

The disabled state is entered during power-on reset and when the deterministic synchronization is disabled. The control unit 245 sets the DST select 246 and the SRC select 248 so that no delay is introduced by any phase slices 201 that receive the DST select 246 and the SRC select 248 signals. In other words, the phase slices 201 are configured to operate in a non-deterministic manner, i.e., a signal may be sampled within a metastability window as the signal is transmitted between different clock domains. The control unit 245 negates the signal 211 when in the disabled state to quiet the phase slices 210-0, 210-1, 210-2, 210-3, and 210-4. Clock gating may be applied to the 210-0, 210-1, 210-2, 210-3, and 210-4 during the disabled state to reduce power consumption.

The initialize state causes the signal 211, SRC clock 130, and the DST clock 135 to be applied by the control unit 245 to the phase slices 210-0, 210-1, 210-2, 210-3, and 210-4 so that phase detection may be performed by the characterization unit 240. The control unit 245 toggles signal 211 that is received by the phase slices 210-0, 210-1, 210-2, 210-3, and 210-4 to being the measurement of phase offsets between the SRC clock 130 and the DST clock 135. Each phase slice 210 outputs a single bit of a phase detect signal DST_DET_RAW [4:0], where the output of the phase slice 210-0 is DST_DET_RAW[0], the output of the phase slice 210-1 is DST_DET_RAW[1], the output of the phase slice 210-2 is DST_DET_RAW[2], the output of the phase slice 210-3 is DST_DET_RAW[3], and the output of the phase slice 210-4 is DST_DET_RAW[4].

During the phase_detect state the characterization unit 240 measures the relative phase using the signals provided by the phase slices 210-0, 210-1, 210-2, 210-3, and 210-4 and generates the status 235 that encodes the relative phase offset. In one embodiment, the following equations are used to generate a four bit status 235:

STATUS[3]=STATUS[3]||(DST_DET_RAW[4]^DST_DET_RAW[2])

STATUS[2]=STATUS[2]||(DST_DET_RAW[3]^DST_DET_RAW[2])

STATUS[1]=STATUS[1]||(DST_DET_RAW[1]^DST_DET_RAW[2])

STATUS[0]=STATUS[0]||(DST_DET_RAW[0]^DST_DET_RAW[2])

Based on the select values provided to SRC select 225 and DST select 226 for each of the phase slices 210-0, 210-1, 210-2, 210-3, and 210-4, the status 235 encodes the relative phase offset between the different clocks (SRC clock 130 and DST clock 135). When the aforementioned equations are used to generate the four bits of status 235, the following relative phase offset information is encoded, where the base_delay is the delay of each delay unit 220 within the delay element 205 (also referred to as a delay unit):

STATUS[3] The SRC clock edge occurs within 2*base_delay before the DST clock edge STATUS[2] The SRC clock edge occurs within 1*base_delay before the DST clock edge STATUS[1] The SRC clock edge occurs within 1*base_delay after the DST clock edge STATUS[0] The SRC clock edge occurs within 2*base_delay after the DST clock edge While in the phase_lock state, the control unit 245 generates the DST select 246 and SRC select 248 based on the status 235, thereby configuring one or more phase slices 201 (outside of the phase detection circuit 200) to operate in the deterministic mode. In one embodiment, the SRC select 248 and the DST elect 246 are generated using the following equations and pseudocode:

```
src_overlaps_dst       = STATUS[2] && STATUS[1];
src_little_before_dst  = STATUS[2] && !STATUS[1] && !STATUS[0];
src_little_after_dst   = STATUS[1] && !STATUS[2] && !STATUS[3];
src_much_before_dst    = STATUS[3] && !STATUS[2] && !STATUS[1] && !STATUS[0];
src_much_after_dst     = STATUS[0] && !STATUS[1] && !STATUS[2] && !STATUS[3];
if ( src_little_after_dst || src_much_after_dst ) begin
   SRC_D_SEL[0]  <= 1'b1;
   // delay SRC clock because the SRC clock is close to DST clock
   SRC_D_SEL[1]  <= src_little_after_dst;
end
if ( src_overlaps_dst || src_little_before_dst ||
src_much_before_dst ) begin
   DST_CLK_SEL[0] <= 1'b1;
   // delay the DST clock because because SRC clock is close
to DST clock
```

-continued

```
        DST_CLK_SEL[1] <= src overlaps dst ||
        src_little_before_dst;
        end
```

The following equations help determine if there is an illegal phase-detect status combination, which causes the control unit 245 to generate an assertion and generate no delays for either the SRC clock or the DST clock:

```
src_far_overlaps_dst     = STATUS[3] && STATUS[0] &&
!(STATUS[2] && STATUS[1] );
got_phase_detect         = |STATUS;
got_legal_phase_detect   = |{src_overlaps_dst,
src_little_before_dst, src_little_after_dst,
src_much_before_dst, src_much_after_dst,
src_far_overlaps_dst};
phase_detect_error = got_phase_detect ^
got_legal_phase_detect;
```

An illegal combination of the status bits may indicate that the clock jitter is worse than expected.

When the state transitions from the phase_detect state to the phase_lock state the status 235 may be cleared. In one embodiment, the state 235 transitions from the phase_lock state back to the phase_detect state to confirm that the status 235 has not changed compared with the value that was generated during the previous phase_detect state. After confirming that the status 235 has not changed, the state 235 may transition from the phase_detect state back to the disabled state.

The state 235 should be implemented using gray-coded values to ensure smooth, error-free transitions to the different states. For example, the following state assignments may be used: disable=2'b00, initialize=2'b01, phase_detect=2'b11, and phase_lock=2'b11. In one embodiment the status 235 may be scanned out through a scan chain so that one can ensure that the status values did not change during an experiment.

A single phase detection circuit 200 may be employed to generate the DST select 226 and SRC select 225 inputs for multiple phase slices 201 that are each configured to transmit a single bit between two clock domains. In other words, each phase slice 201 transmits a single bit and multiple phase slices 201 are controlled by a single phase detection circuit 200 to transmit multiple bits between different clock domains. However, the multiple phase slices 201 and single phase detection circuit 200 may be laid out for fabrication as a library-cell macro in order to ensure the same clock insertion delays between the phase detection circuit 200 and the multiple phase slices 201. Otherwise, the phase detection circuit 200 may generate a DST select 246 and/or a SRC select 248 that does not ensure deterministic operation of the multiple phase slices 201 due to clock skew between the multiple phase slices 201 and the phase detection circuit 200.

In an alternate embodiment, the phase detection circuit 200 may include three phase slices 210 instead of five phase slices 210 and the delay element 205 may be configured to insert a base delay of 400 ps instead of 200 ps. When three phase slices 210 are used, a first phase slice 210 is configured to insert one base delay of 400 ps into the SRC clock 130 and a second phase slice 210 is configured to insert one base delay into the DST clock 135. The third phase slice 210 is configured to not insert a base delay into either the SRC clock 130 or the DST clock 135. In the event that the first and second phase slices 210 indicate that the rising edges of the SRC clock 130 and the DST clock 135 overlap, the characterization unit 240 is unable to determine if the SRC clock 130 and the DST clock 135 are offset by a ½ clock cycle or are nearly synchronous. By using two additional phase slices 210 for a total of five in the phase detection circuit 200, the margin is increased and the characterization unit 240 is better able to determine the relative offset between the SRC clock 130 and the DST clock 135.

In other alternate embodiments, the delay element 205 includes more than two delay units 220 and additional phase slices 210 are included within the phase detection circuit 200. For example, when three delay units 220 are used, seven phase slices 210 are included within the phase detection circuit 200 and when 4 delay units 220 are used, nine phase slices 210 are included within the phase detection circuit 200.

Figure 2D:
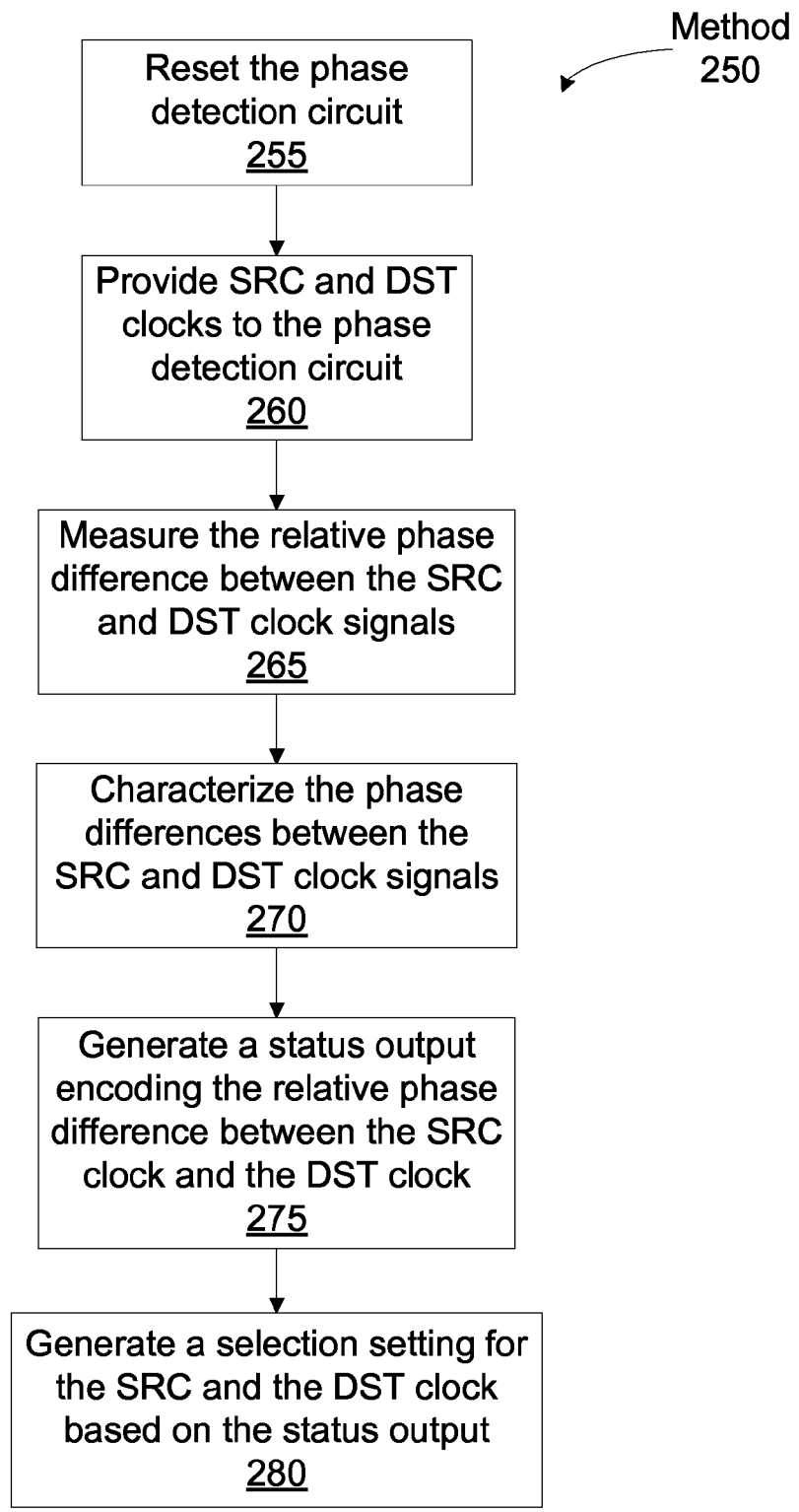
FIG. 2D sets forth a flow diagram of method steps for operating the phase detection circuit of FIG. 2C, according to one embodiment of the present invention.

FIG. 2D sets forth a flow diagram of method steps for operating the phase detection circuit of FIG. 2C, according to one embodiment of the present invention. Although the method steps are described in conjunction with the systems of FIGS. 1, 2A, 2B, and 2C, persons of ordinary skill in the art will understand that any system configured to perform the method steps, in any order, is within the scope of the inventions.

The method 250 begins at step 255, when the phase detection circuit 200 is reset by configuring the state 244 to enter the disabled state. When in the disabled state the characterization unit 240 configures phase slices 201 to operate in a non-deterministic manner and the phase slices 210 within the phase detection circuit 200 are clock-gated off. At step 260 the state 244 transitions from the disabled state to the initialize state and the control unit 245 provides the SRC clock 130 and the DST clock 135 to the phase slices 210-0, 210-1, 210-2, 210-3, and 210-4. At step 265 the state 244 transitions from the initialize state to the phase_detect state and the control unit 245 generates the signal 211 that transitions from high to low or low to high to allow measurement of the relative phase difference between the SRC clock 130 and the DST clock 135. Measurements are provided to the characterization unit by the phase slices 210-0, 210-1, 210-2, 210-3, and 210-4.

At step 270 the characterization unit 240 characterizes the phase differences between the SRC clock 130 and the DST clock 135 based on the outputs of the phase slices 210-0, 210-1, 210-2, 210-3, and 210-4. At step 275 the characterization unit 240 generates the status 235 that encodes the relative phase difference between SRC clock 130 and the DST clock 135. At step 280 the state 244 transitions from the phase_detect state to the phase_lock state and the control unit 245 generates selection settings, DST select 246 and SRC select 248 that are provided to SRC select 225 and DST select 226, respectively, to control the delay introduced for the clocks used within the phase slices 210.

Figure 2E:
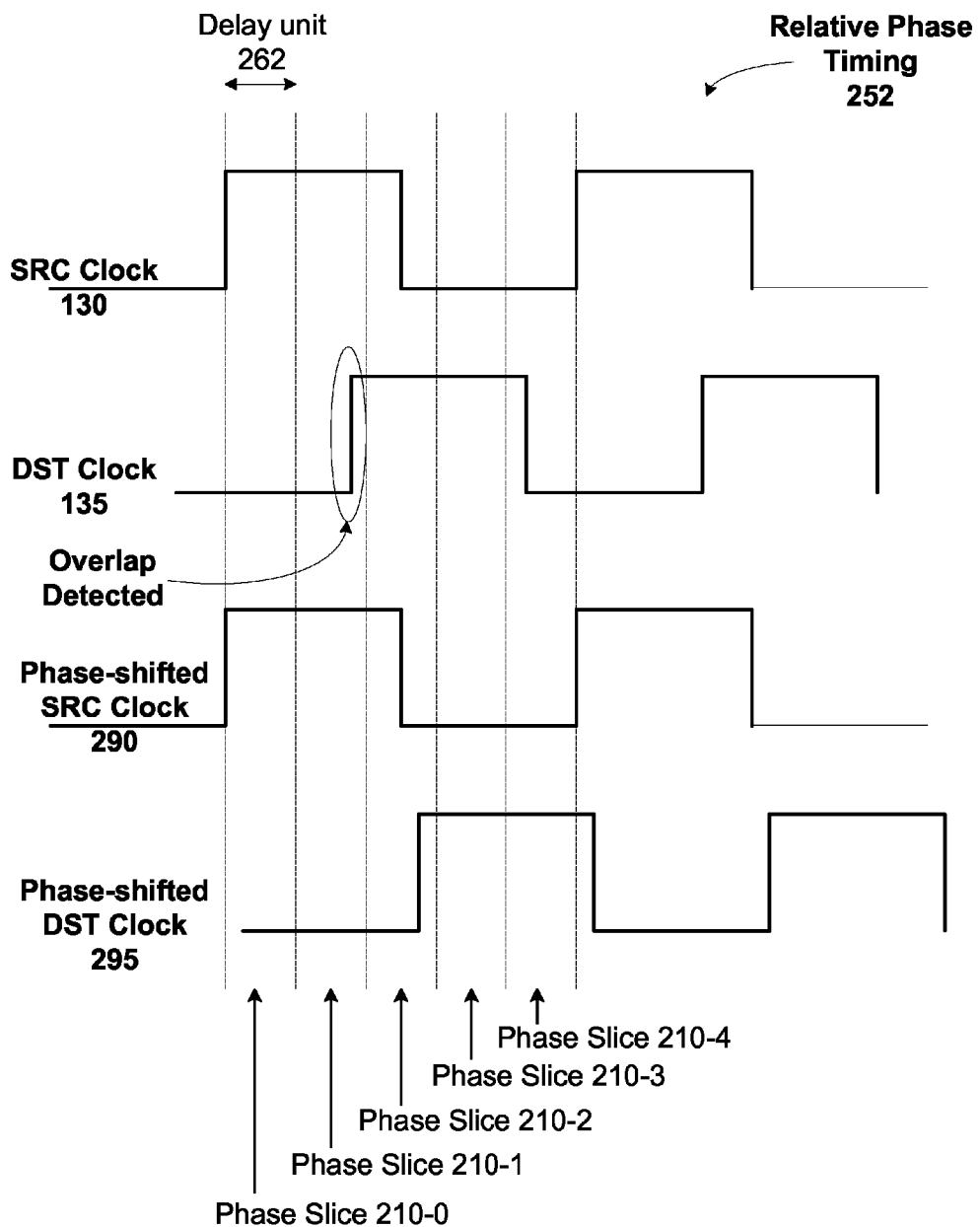
FIG. 2E is a timing diagram illustrating the relative phase timing, according to one embodiment of the present invention.

FIG. 2E is a timing diagram illustrating the relative phase timing 252, according to one embodiment of the present invention. The phase detection circuit 200 is configured to measure the relative phase timing between the SRC clock 130 and the DST clock 135 and generate the DST select 246 and the SRC select 248 signals to delay one or more of the SRC clock 130 and the DST clock 135 within each of the phase slices 201 as needed to deterministically sample the SRC signal 211 when the deterministic synchronization unit 100 is configured to operate in the deterministic mode. As shown in the relative phase timing 252, overlap is detected between the DST clock 135 and the SRC clock 130. The DST clock 135 needs to be shifted relative to the SRC clock 130 so that the rising edge of the DST clock 135 does not occur when the SRC clock 130 is asserted. In other words, a destination flip-flop clocked using the DST clock 135 should sample data output by a source flip-flop when the SRC clock 130 is low so that the source flip-flop is outputting data that was sampled by the source flip-flop on the rising edge of the SRC clock 130. The preferred relationship between the rising edges of the SRC clock 130 and the DST clock 135 is to be out of phase by half of the clock period of the faster of the SRC clock 130 and the DST clock 135.

In this example, the DST clock 135 should be delayed by one delay unit 262. The delay unit 262 equals 200 ps (⅕ of the shortest clock period) for slow-slow-low-voltage corner operating conditions assuming a 1 GHz max clock frequency. The ability to configure the delay element 205 to have two or more different delays provides more margin because the DST clock 135 can be delayed by a single delay unit when the rising edge of the DST clock 135 is clock to the middle of the SRC clock 130 cycle. Note that the number of phase slices 210 in the phase detection circuit 200 is related to the delay unit 262 in that there are 5 phase slices 210 and there are 5 delay units 262 within a clock cycle. As shown in the relative phase timing 252, the phase-shifted SRC clock 290 is shifted without any delay compared with the SRC clock 130. The phase-shifted DST clock 295 is shifted by one delay unit 262 compared with the DST clock 135. The status 235 generated by the characterization unit 240 corresponding to the delay adjustment is 4'b1000 because the rising edge of the SRC clock 130 is within 2*(delay unit) before the rising edge of the DST clock 135.

In one embodiment, a delay introduced by the delay unit 220 allows for a timing budget of 120 ps for the fast-fast high-voltage process corner (FF) when the delay is 60 ps (60+60=120). The timing budget is 400 ps for the slow-slow low-voltage process corner (SS) (200+200=400). Items that consume portions of the timing budget include, the metastability window of a flip-flop using in the synchronization circuitry (FF=20 ps and SS=50 ps), clock jitter of the SRC clock and DST clock which can be shifting in opposite directions (FF=40 ps*2=80 ps and SS=150 ps*2=310 ps), clock insertion delay difference (skew) within cells in a library (FF=Sps and SS=10 ps), temperature drift (FF=10 ps and SS=26 ps). The total of the additional items is 115 ps for FF and 396 ps for SS. Note that for the example timings provided for SS and FF conditions that nearly 400 ps of margin is needed to accommodate the SS timing.

Figure 3A:
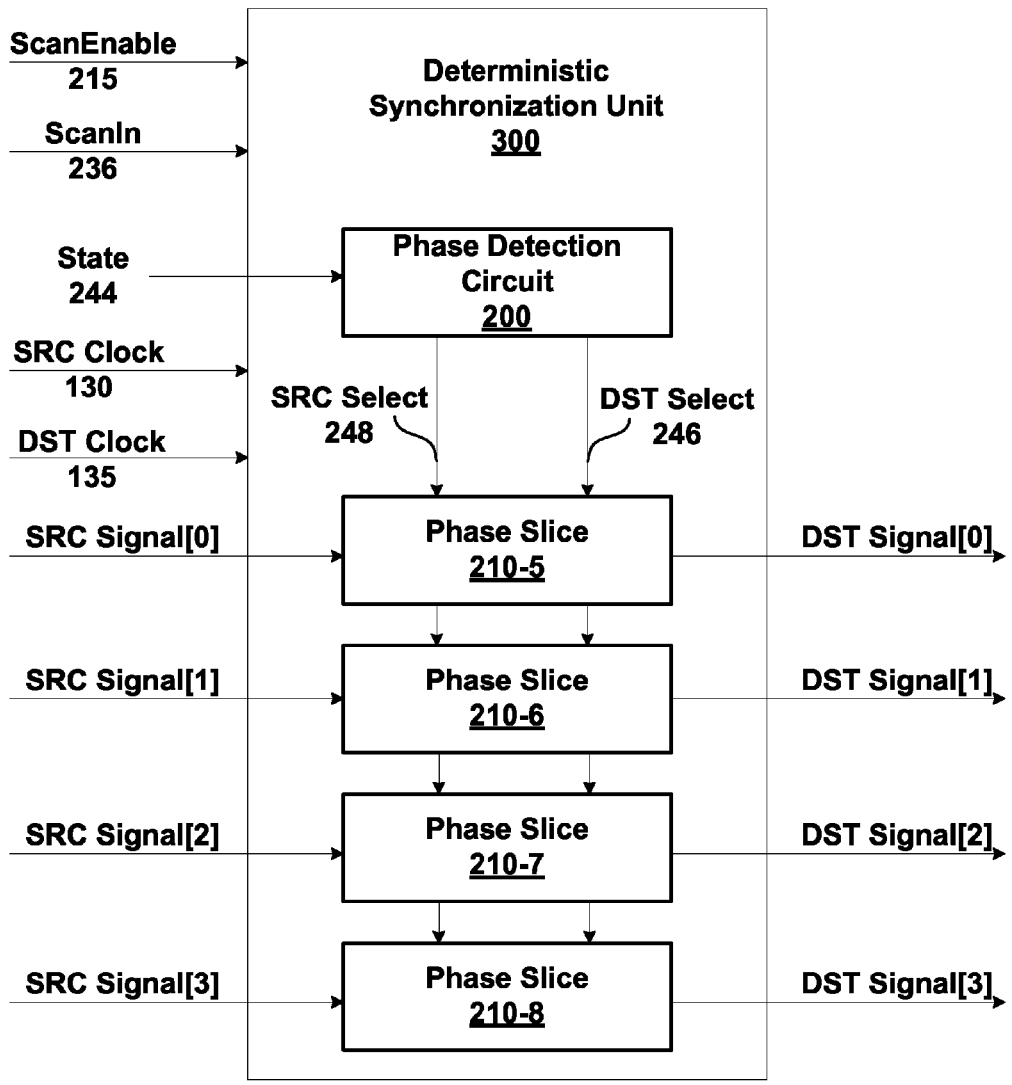
FIG. 3A is a block diagram of the deterministic synchronization unit, according to one embodiment of the present invention.

FIG. 3A is a block diagram of a four bit deterministic synchronization unit 300, according to one embodiment of the present invention. The deterministic synchronization unit 300 includes a phase detection circuit 200 and four phase slices 210, e.g., phase slice 210-5, 210-6, 210-7, and 210-8, i.e., one for each bit that will be transmitted from the SRC clock 240 domain to the DST clock 135 domain. The phase detection circuit 200 generates the SRC select 248 and DST select 246 that are received by the phase slices 210-5, 210-6, 210-7, and 210-8. The phase slices 210-5, 210-6, 210-7, and 210-8 may be configured to operate in deterministic mode to perform functional or timing debug. Alternatively, the phase slices 210-5, 210-6, 210-7, and 210-8 may be configured to operate in non-deterministic (normal) mode during which the SRC select 248 and DST select 246 are configured to insert no delays in the SRC clock 130 and the DST clock 135. The phase slices 210-5, 210-6, 210-7, and 210-8 receive SRC signal [3:0] in the SRC clock 130 domain and transmits the SRC signal [3:0] to the DST clock 135 domain as DST signal [3:0]. Deterministic synchronization units may be constructed for other bit widths (N), as long as timing variations of the SRC clock 130 and DST clock 135 signals are minimized to ensure proper operation of the circuits. Each N-bit wide deterministic synchronization unit 300 should have a dedicated phase detection circuit 200, where N is an integer.

Figure 3B:
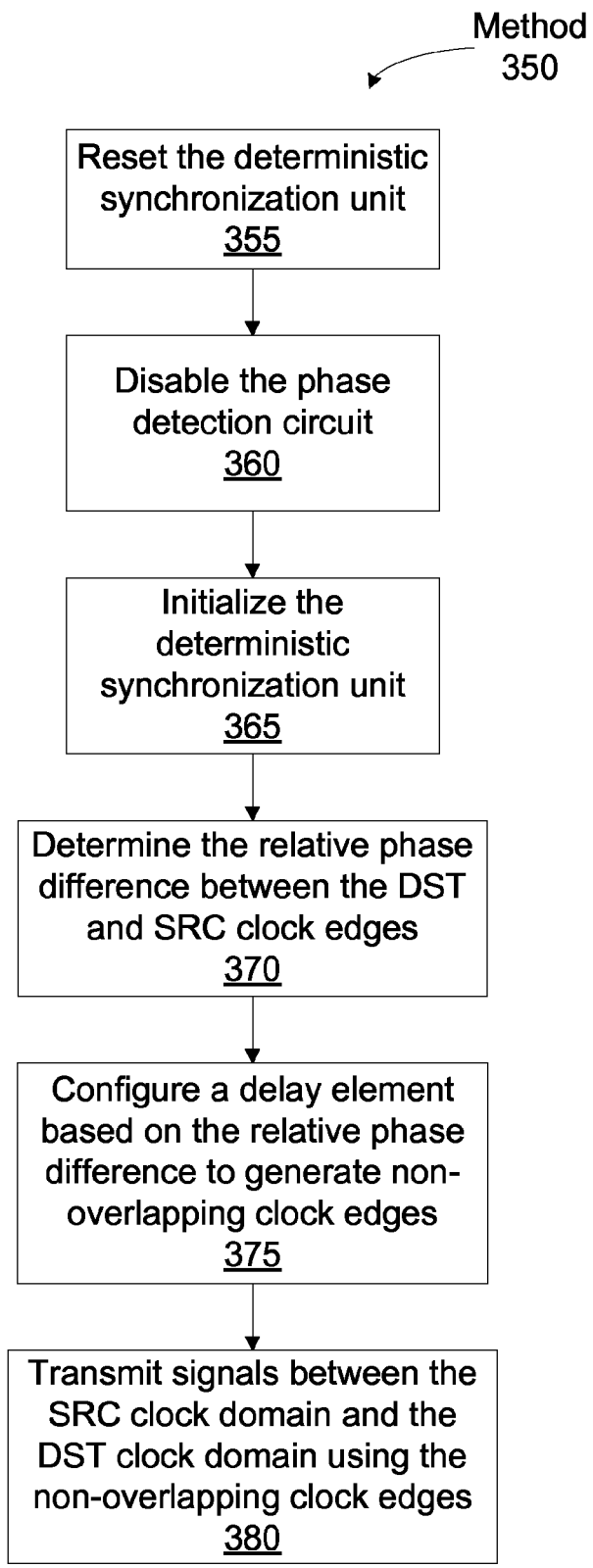
FIG. 3B sets forth a flow diagram of method steps for configuring the deterministic synchronization unit of FIG. 3A, according to one embodiment of the present invention.

FIG. 3B sets forth a flow diagram of method steps for configuring the deterministic synchronization unit of FIG. 3A, according to one embodiment of the present invention. Although the method steps are described in conjunction with the systems of FIGS. 1, 2A, 2B, 2C, and 3A persons of ordinary skill in the art will understand that any system configured to perform the method steps, in any order, is within the scope of the inventions.

The method 350 begins at step 355, when the deterministic synchronization unit 300 is reset by configuring the state 244 to encode the disabled state. At step 360 the phase detection circuit 200 enters the disabled state and the characterization unit 240 configures phase slices 201 to operate in a non-deterministic manner. At step 365 the state 244 transitions from the disabled state to the initialize state and the control unit 245 provides the SRC clock 130 and the DST clock 135 to the phase slices 210-0, 210-1, 210-2, 210-3, and 210-4 within the deterministic synchronization unit 300. At step 370 the state 244 transitions from the initialize state to the phase_detect state and the deterministic synchronization unit 300 determines the relative phase difference between the rising edges of the SRC clock 130 and the DST clock 135.

At step 375 the state 244 transitions from the phase_detect state to the phase_lock state and the deterministic synchronization unit 300 configures at least one delay element 205 based on the relative phase difference to generating non-overlapping clock edges. At step 380 the SRC signal [3:0] in the SRC clock 130 domain is deterministically transmitted to the DST clock 135 domain to generate the DST signal [3:0]. The deterministic synchronization unit 300 operates in the deterministic mode until a reset signal is received, thereby restoring the non-deterministic (normal) mode of operation. Note that a separate reset signal is used to reset the deterministic synchronization unit 300 compared with the circuitry that resides in either the SRC clock 130 domain or the DST clock 135 domain. When the deterministic synchronization unit 300 is configured in the deterministic mode, other circuitry may be reset multiple times, such as between different runs of a test sequence during a debug session.

System Overview

Figure 4A:
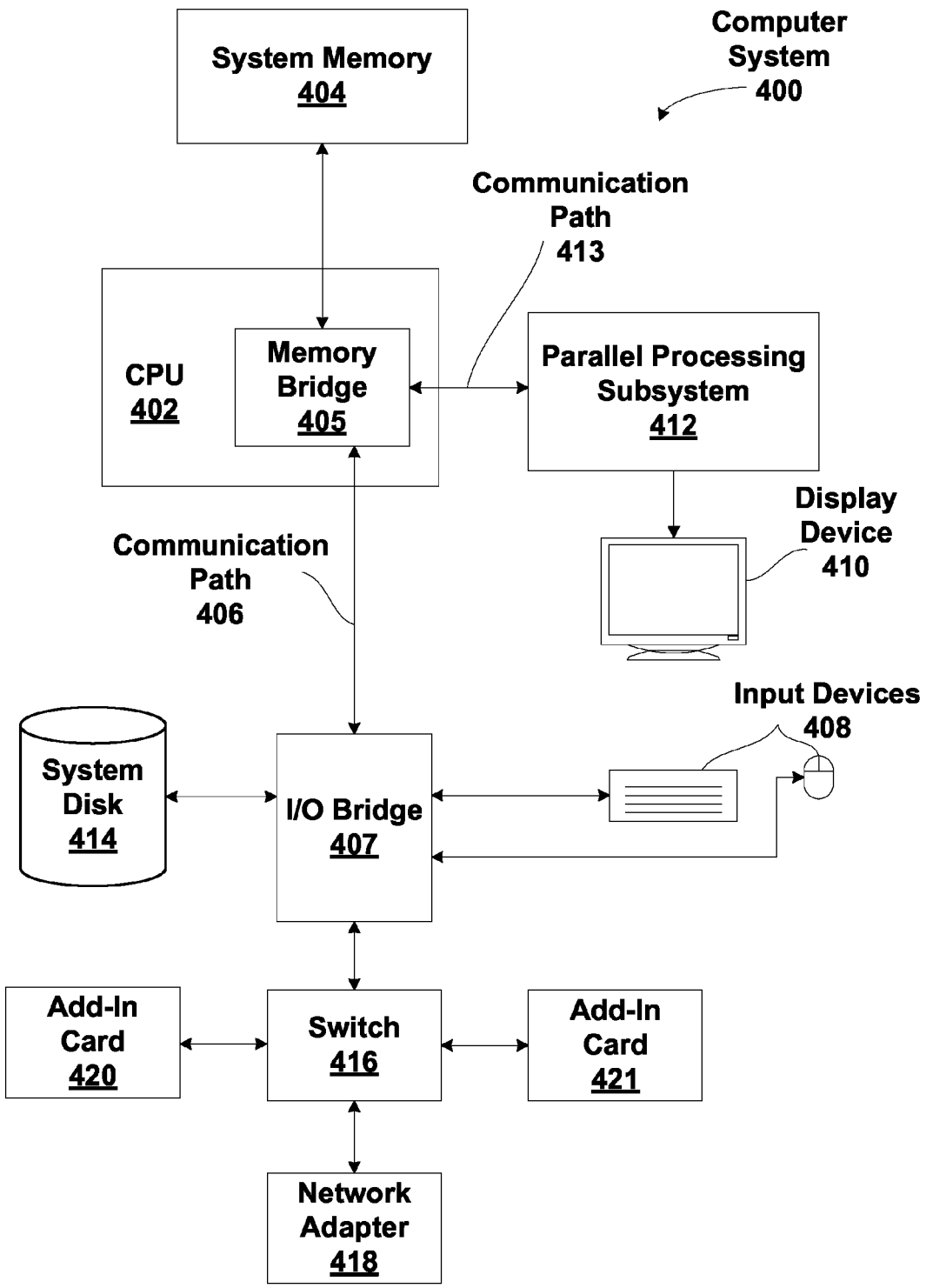
FIG. 4A is a block diagram illustrating a computer system configured to implement one or more aspects of the present invention.

FIG. 4A is a block diagram illustrating a computer system 400 configured to implement one or more aspects of the present invention. Computer system 400 includes a central processing unit (CPU) 402 and a system memory 404 communicating via an interconnection path that may include a memory bridge 405. Memory bridge 405, which may be, e.g., a Northbridge chip, is connected via a bus or other communication path 406 (e.g., a HyperTransport link) to an I/O (input/output) bridge 407. I/O bridge 407, which may be, e.g., a Southbridge chip, receives user input from one or more user input devices 408 (e.g., keyboard, mouse) and forwards the input to CPU 402 via communication path 406 and memory bridge 405. A parallel processing subsystem 412 is coupled to memory bridge 405 via a bus or second communication path 413 (e.g., a Peripheral Component Interconnect (PCI) Express, Accelerated Graphics Port, or HyperTransport link); in one embodiment parallel processing subsystem 412 is a graphics subsystem that delivers pixels to a display device 410 that may be any conventional cathode ray tube, liquid crystal display, light-emitting diode display, or the like. A system disk 414 is also connected to I/O bridge 407 and may be configured to store content and applications and data for use by CPU 402 and parallel processing subsystem 412.

System disk 414 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 416 provides connections between I/O bridge 407 and other components such as a network adapter 418 and various add-in cards 420 and 421. Other components (not explicitly shown), including universal serial bus (USB) or other port connections, compact disc (CD) drives, digital versatile disc (DVD) drives, film recording devices, and the like, may also be connected to I/O bridge 407. The various communication paths shown in FIG. 4A, including the specifically named communication paths 406 and 413 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 412 incorporates circuitry optimized for graphics and video processing, including, for example, video output circuitry, and constitutes a graphics processing unit (GPU). In another embodiment, the parallel processing subsystem 412 incorporates circuitry optimized for general purpose processing, while preserving the underlying computational architecture, described in greater detail herein. In yet another embodiment, the parallel processing subsystem 412 may be integrated with one or more other system elements, such as the memory bridge 405, CPU 602, and I/O bridge 407 to from a system on chip (SoC). One or more of CPU 402, parallel processing sub-system 412, I/O bridge 607, and switch 416 may include the deterministic synchronization unit 100 to transmit signals between two different clock domains.

In one embodiment a deterministic synchronization unit 100 within the computer system 400 is reset separately from the first clock domain circuits 105 and the second clock domain circuits 115. When the deterministic synchronization unit 100 is configured in the deterministic mode, the first clock domain circuits 105 and the second clock domain circuits 115 may be reset as needed to perform operations, such as context switching. Upon reset, the SRC clock 130 and DST clock 135 are driven and the deterministic synchronization unit 100 is configured to not delay into the SRC clock 130 and DST clock 135.

Clock gating may be employed to reduce power consumption. However, during initialization, the deterministic synchronization unit 100 or 300 may not be clock gated. After initialization, when phase detection is complete, the SRC clock 130 and DST clock 135 inputs to the phase detection circuit 200 within the deterministic synchronization unit 100 or 300 may be gated. Finally, when the deterministic synchronization unit 100 or 300 exits a power saving mode (during which time the SRC clock 130 and the DST clock 135 are gated) the phase slices 201 within the deterministic synchronization units 100 or 300 should be configured to operate in the non-deterministic mode and the SRC clock 130 and DST clock 135 inputs to the phase detection circuit 200 within the deterministic synchronization unit 100 or 300 may be gated.

It will be appreciated that the system shown herein is illustrative and that variations and modifications are possible. The connection topology, including the number and arrangement of bridges, the number of CPUs 402, and the number of parallel processing subsystems 412, may be modified as desired. For instance, in some embodiments, system memory 404 is connected to CPU 402 directly rather than through a bridge, and other devices communicate with system memory 404 via memory bridge 405 and CPU 402. In other alternative topologies, parallel processing subsystem 412 is connected to I/O bridge 407 or directly to CPU 402, rather than to memory bridge 405. In still other embodiments, I/O bridge 407 and memory bridge 405 might be integrated into a single chip instead of existing as one or more discrete devices. Large embodiments may include two or more CPUs 402 and two or more parallel processing subsystems 412. The particular components shown herein are optional; for instance, any number of add-in cards or peripheral devices might be supported. In some embodiments, switch 416 is eliminated, and network adapter 418 and add-in cards 420, 421 connect directly to I/O bridge 407.

Figure 4B:
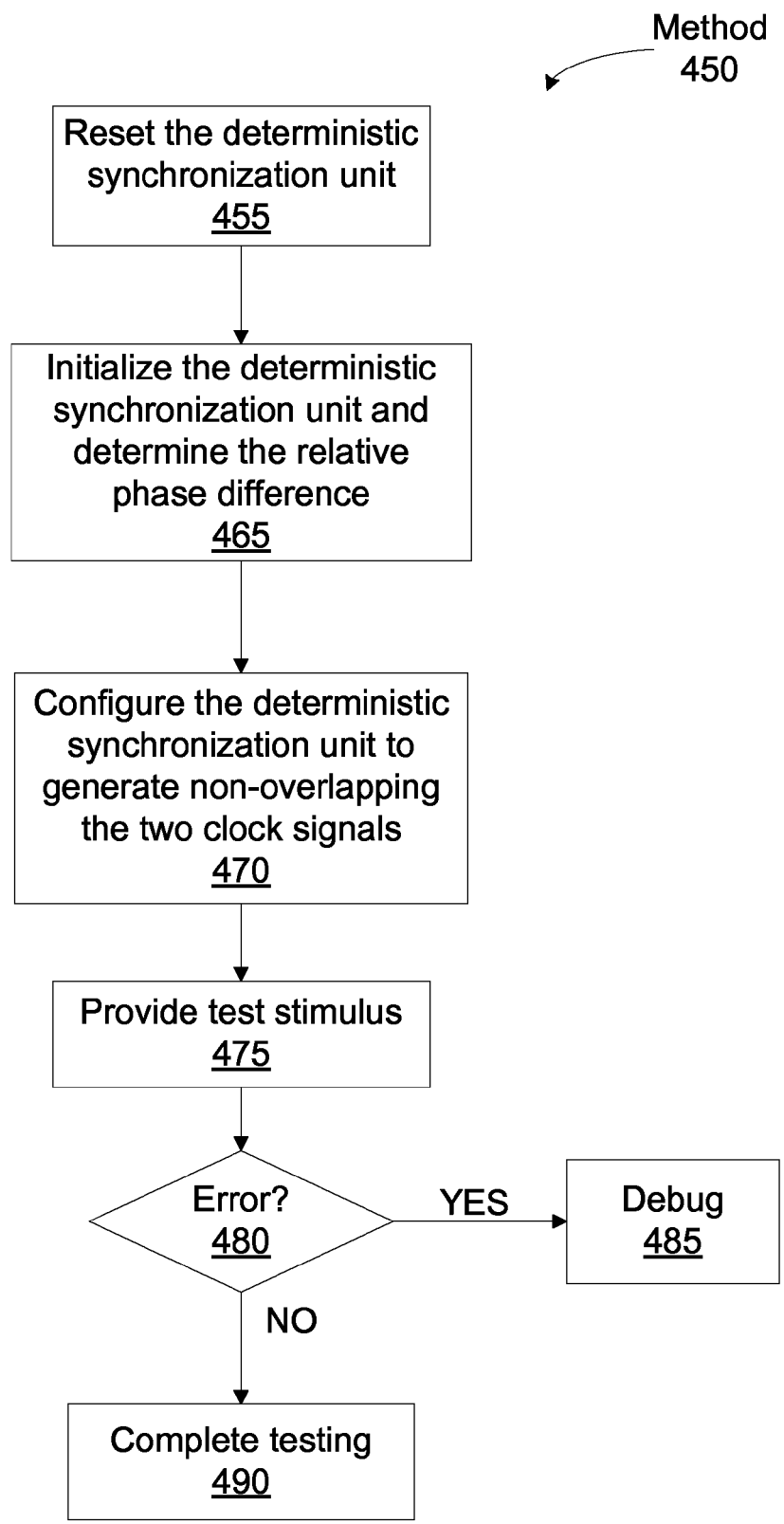
FIG. 4B sets forth a flow diagram of method steps for operating the deterministic synchronization unit of FIG. 3A, according to one embodiment of the present invention.

FIG. 4B sets forth a flow diagram of method steps 450 for operating the deterministic synchronization units 100 and 300 of FIGS. 1 and 3A, respectively, according to one embodiment of the present invention. Although the method steps are described in conjunction with the systems of FIGS. 1, 2A, 2B, 2C, 3A, and 4A persons of ordinary skill in the art will understand that any system configured to perform the method steps, in any order, is within the scope of the inventions.

The method 450 begins at step 455, when the deterministic synchronization unit 100 or 300 is reset by configuring the state 244 to encode the disabled state. At step 465 the deterministic synchronization unit 100 or 300 is initialized and the control unit 245 provides the SRC clock 130 and the DST clock 135 to the phase slices 210-0, 210-1, 210-2, 210-3, and 210-4 within the deterministic synchronization unit 300. At step 470 the deterministic synchronization unit 100 or 300 configures at least one delay element 205 based on the relative phase difference to operate in a deterministic mode. At step 475 test stimulus is applied to a device that includes the deterministic synchronization unit 100 or 300. The test stimulus may be used to perform functional verification or timing verification of circuitry in the device. At step 480 a user determines if an error is identified based on the results of the test stimulus, and, if not, at step 490 testing is complete. Otherwise, at step 485 the deterministic synchronization unit 100 or 300 remains configured in the deterministic mode to debug the device. In one embodiment, the test stimulus may first be applied while the deterministic synchronization unit 100 or 300 is configured in the non-deterministic mode and the deterministic mode may be used during step 485 when the device is being debugged.

In sum, a phase detector circuit is configured to measure and characterize the relative phase between a source clock that is used in a first clock domain and a destination clock that is used in a second clock domain. Configurable delay elements are adjusted based on the characterization to generate phase-shifted versions of the source and destination clocks. The phase-shifted versions of the source and destination clocks are non-overlapping, meaning that the rising edge of the destination clock does not occur when the source clock is asserted. The non-overlapping source and destination clocks are used by a deterministic synchronization unit to ensure that signals being transmitting from the first clock domain to the second clock domain are not sampled within a metastability window. Consequently, the asynchronous boundary crossing behaves in a deterministic manner—that is, when applied repeatedly, a transition sequence of the signal in the first clock domain produces a substantially similar output transition sequence in the second clock domain on a cycle-by-cycle basis.

One advantage of the disclosed method is that the deterministic mode can be used to debug functional failures as well as timing failures. Additionally, multiple cascaded delay elements are employed in the configurable delay unit to allow the synchronizer to operate across a wide range of process corners. The deterministic synchronization unit 300 may also be configured to conserve power by turning off unused circuitry when the deterministic mode is enable.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for transmitting a first signal between a first clock domain and a second clock domain, the method comprising:
    determining a relative phase difference between a source clock of the first clock domain and a destination clock of the second clock domain, wherein the destination clock is not derived from the source clock, and wherein the relative phase difference is measured for different combinations of delay configurations of the source clock and the destination clock;
    configuring a delay element based on the relative phase difference to generate a phase-shifted source clock and a phase-shifted destination clock; and
    transmitting the first signal between the first clock domain and the second clock domain using the phase-shifted source clock and the phase-shifted destination clock.

2. The method of claim 1, wherein the phase difference is measured between a rising edge of the source clock and a rising edge of the destination clock.

3. The method of claim 1, wherein the delay element is configured to ensure that a rising edge of the phase-shifted destination clock does not occur when the phase-shifted source clock is asserted.

4. The method of claim 1, wherein the delay element is configured to insert no delay, one unit of delay, or two units of delay to generate the phase-shifted source clock and the phase-shifted destination clock.

5. The method of claim 1, further comprising:
    receiving a reset signal;
    configuring the delay element to generate the phase-shifted source clock that is not delayed compared with the source clock;
    configuring the delay element to generate the phase-shifted destination clock that is not delayed compared with the destination clock; and
    transmitting the first signal between the first clock domain and the second clock domain using the phase-shifted source clock and the phase-shifted destination clock.

6. The method of claim 1, wherein the source clock and the destination clock are generated from a single phase-locked loop.

7. The method of claim 1, wherein a frequency of the source clock is an integer multiple of a frequency of the destination clock or the frequency of the destination clock is an integer multiple of the frequency of the source clock.

8. The method of claim 1, further comprising disabling the delay element to reduce power consumption when a deterministic operating mode is not enabled.

9. The method of claim 1, further comprising disabling determination of the relative phase difference between the source clock of the first clock domain and the destination clock of the second clock domain to reduce power consumption when a deterministic operating mode is not enabled.

10. A deterministic synchronization unit comprising:
    a phase detection circuit that is configured to determine a relative phase difference between a first clock domain and a second clock domain; and
    a phase slice comprising:
        a delay element that is configured based on the relative phase difference to generate a phase-shifted source clock and a phase-shifted destination clock based on the relative phase difference, wherein the destination clock is not derived from the source clock, and wherein the relative phase difference is measured for different combinations of delay configurations of the source clock and the destination clock; and
        transmission circuitry configured to transmit a first signal between the first clock domain and the second clock domain using the phase-shifted source clock and the phase-shifted destination clock.

11. The deterministic synchronization unit of claim 10, wherein the phase detection circuit is further configured to determine the relative phase difference between a rising edge of the source clock and a rising edge of the destination clock.

12. The deterministic synchronization unit of claim 10, wherein the delay element is further configured to ensure that a rising edge of the phase-shifted destination clock does not occur when the phase-shifted source clock is asserted.

13. The deterministic synchronization unit of claim 10, wherein the delay element is configured to insert no delay, one unit of delay, or two units of delay to generate the phase-shifted source clock and the phase-shifted destination clock.

14. The deterministic synchronization unit of claim 10, wherein the phase detection circuit that is configured is further configured to:
    receive a reset signal;
    configure the delay element to generate the phase-shifted source clock that is not delayed compared with the source clock; and
    configure the delay element to generate the phase-shifted destination clock that is not delayed compared with the destination clock.

15. The deterministic synchronization unit of claim 10, wherein the source clock and the destination clock are generated from a single phase-locked loop.

16. The deterministic synchronization unit of claim 10, wherein a frequency of the source clock is an integer multiple of a frequency of the destination clock or the frequency of the destination clock is an integer multiple of the frequency of the source clock.

17. The deterministic synchronization unit of claim 10, wherein the phase slice further comprises circuitry configured to disable the delay element to reduce power consumption when a deterministic operating mode is not enabled.

18. A computing system, comprising:
a deterministic synchronization unit comprising:
a phase detection circuit that is configured to determine a relative phase difference between a first clock domain and a second clock domain, wherein the relative phase difference is measured for different combinations of delay configurations of the source clock and the destination clock; and
a phase slice comprising:
a delay element that is configured based on the relative phase difference to generate a phase-shifted source clock and a phase-shifted destination clock based on the relative phase difference, wherein the destination clock is not derived from the source clock; and
transmission circuitry configured to transmit a first signal between the first clock domain and the second clock domain using the phase-shifted source clock and the phase-shifted destination clock.

19. The method of claim 1, wherein each delay element is split into two equal segments to enable control of the delay.

20. The method of claim 1, wherein a base delay of a delay element is one-fifth of a clock period of the source clock.

21. The method of claim 8, wherein the delay element is disabled via an AND gate coupled to an input of the delay element.

22. The computing system of claim 18, wherein the phase detection circuit includes a characterization configured to:
receive a plurality of second signals, wherein each second signal represents a different combination of a delay configuration of the source clock and the destination clock; and
transmit a status signal that encodes the relative phase difference between the first clock domain and the second clock domain based at least in part on the plurality of second signals.

23. The computing system of claim 18, wherein the phase slice is further configured to:
detect that a scan enable signal is asserted; and
prior to transmission of the first signal, substitute the first signal with a scan input signal.

\* \* \* \* \*